United States Patent
Hornung et al.

(12) 
(10) Patent No.: US 6,490,668 B2
(45) Date of Patent: Dec. 3, 2002

(54) SYSTEM AND METHOD FOR DYNAMICALLY MOVING CHECKSUMS TO DIFFERENT MEMORY LOCATIONS

(75) Inventors: Bryan Hornung; Gregory S Palmer, both of Plano; Paul F. Vogel, Garland, all of TX (US)

(73) Assignee: Hewlett-Packard Company, Palo Alto, CA (US)

( * ) Notice: Subject to any disclaimer, the term of this patent is extended or adjusted under 35 U.S.C. 154(b) by 32 days.

(21) Appl. No.: 09/738,697

(22) Filed: Dec. 15, 2000

(65) Prior Publication Data

US 2002/0078314 A1 Jun. 20, 2002

(51) Int. Cl.$^7$ .............................................. G06F 12/00
(52) U.S. Cl. ....................................... 711/165; 711/162
(58) Field of Search ................................ 711/154, 165, 711/162

(56) References Cited

U.S. PATENT DOCUMENTS

| | | | |
|---|---|---|---|
| 4,695,947 A | 9/1987 | Ikeda et al. .................. 364/200 |
| 4,849,978 A | 7/1989 | Dishon et al. ................. 371/51 |
| 5,230,045 A | 7/1993 | Sindhu ........................ 395/425 |
| 5,446,691 A | 8/1995 | North et al. ............ 395/189.02 |
| 5,548,788 A | * 8/1996 | McGillis et al. ............... 710/31 |
| 5,761,695 A | 6/1998 | Maeda et al. ................... 711/5 |
| 5,835,954 A | 11/1998 | Duyanovich et al. ....... 711/162 |

* cited by examiner

Primary Examiner—Jack A. Lane

(57) ABSTRACT

A system for moving checksums within memory utilizes a plurality of memory systems and a system manager. A first memory system has a first memory location that is correlated with a checksum indicator. The checksum indicator identifies the memory system that is storing the checksum of the value presently stored at the first location. The system manager dynamically moves the checksum to a destination memory location and updates the checksum indicator such that the checksum indicator identifies the memory system of the destination memory location. While the checksum is being moved, checksum updates may occur to the memory location from which the checksum was moved. Thus, after moving the checksum, the system manager updates the checksum with the value stored at the location from which the checksum was moved. As a result, the checksum stored in the checksum destination location should be sufficiently updated to enable data recovery.

13 Claims, 11 Drawing Sheets

SYSTEM AND METHOD FOR DYNAMICALLY MOVING CHECKSUMS TO DIFFERENT MEMORY LOCATIONS

BACKGROUND OF THE INVENTION

1. Field of the Invention

The present invention generally relates to data processing techniques and, in particular, to a system and method for dynamically moving a checksum from one memory location to another memory location without introducing data errors.

2. Related Art

Large computer systems (e.g., servers) often employ a plurality of memory units to provide enough instruction and data memory for various applications. Each memory unit has a large number of memory locations of one or more bits where data can be stored, and each memory location is associated with and identified by a particular memory address, referred to hereafter as a "memory unit address." When an instruction that stores data is executed, a bus address defined by the instruction is used to obtain a memory unit address, which identifies the memory location where the data is actually to be stored. In this regard, a mapper is often employed that maps or translates the bus address into a memory unit address having a different value than the bus address. There are various advantages associated with utilizing bus addresses that are mapped into different memory unit addresses.

For example, many computer applications are programmed such that the bus addresses are used consecutively. In other words, one of the bus addresses is selected as the bus address to be first used to store data. When a new bus address is to be utilized for the storage of data, the new bus address is obtained by incrementing the previously used bus address.

If consecutive bus addresses are mapped to memory unit addresses in the same memory unit, then inefficiencies may occur. In this regard, a finite amount of time is required to store and retrieve data from a memory unit. If two consecutive data stores occur to the same memory unit, then the second data store may have to wait until the first data store is complete before the second data store may occur. However, if the two consecutive data stores occur in different memory units, then the second data store may commence before the first data store is complete. To minimize memory latency and maximize memory bandwidth, consecutive bus addresses should access as many memory units as possible. This can also be described as maximizing the memory interleave.

As a result, the aforementioned mapper is often designed to map the bus addresses to the memory unit addresses such that each consecutive bus address is translated into a memory unit address in a different memory unit. For example, a bus address having a first value is mapped to a memory unit address identifying a location in a first memory unit, and the bus address having the next highest value is mapped to a memory unit address identifying a location in a second memory unit. Therefore, it is likely that two consecutive data stores from a single computer application do not occur in the same memory unit. In other words, it is likely that consecutive data stores from a computer application are interleaved across the memory units.

Backup systems are often employed to enable the recovery of data in the event of a failure of one of the memory units. For example, U.S. Pat. No. 4,849,978, which is incorporated herein by reference, describes a checksum backup system that may be used to recover the data of a failed memory unit. To backup data stored within the memory units of a typical computer system, one of the memory units in the computer system is designated as a checksum memory unit. Each location in the checksum memory unit is initialized to zero and is correlated with locations in the other non-checksum memory units. Each data value being stored in a location of one of the non-checksum memory units is exclusively ored with the data value previously stored in the location of the one non-checksum memory unit. In other words, the data value being stored via a data store operation is exclusively ored with the data value being overwritten via the same data store operation. The result of the exclusive or operation is then exclusively ored with the value, referred to as the "checksum," in the correlated address of the checksum memory unit. The result of the foregoing exclusive or operation is then stored in the foregoing address of the checksum memory unit as a new checksum value.

When a memory unit fails, the data value stored in a location of the failed memory unit can be recovered by exclusively oring the checksum in the correlated location of the checksum memory unit with each of the values in the other memory units that are stored in locations also correlated with the location of the checksum. The process of maintaining a checksum and or recovering a lost data value based on the checksum is generally well known in the art.

There are situations when it is desirable to move the data values, including the checksum values, stored in one or more locations of one or more of the memory units to other locations in one or more of the memory units. For example, it may be desirable to remove one of the memory units when the memory unit is performing unreliably. To prevent the loss of data that may be stored in the memory unit to be removed, the computer system employing the memory unit is often shut down before removing the memory unit. Once the memory unit has been removed, the computer system is rebooted. The shutting down and rebooting of the computer system is an obviously undesirable consequence of removing the memory unit, since the computer system is unable to run any applications until the reboot is completed.

Some techniques have been developed that allow a memory unit to be removed from the computer system without shutting down the computer system. For example, the processor's virtual memory mapping system may be used to re-map the physical addresses. This results in the temporary halting of applications and the copying of data from the memory unit being removed to a disk or some other data storage device until the removed memory unit is replaced by a new memory unit. The primary reason for halting the executions of applications is to prevent attempts to update the values being moved so that data errors are prevented. All threads in a multi-threaded application as well as the I/O system should always have a consistent view of a memory location.

Once the removed memory unit has been replaced, the aforementioned data copied from the removed memory unit is then written to the new memory unit. Then, execution of applications is resumed. While the foregoing techniques lessen the amount of time that the computer system is unable to run applications, there is still a finite amount of time in which the computer system is unable to run an application.

A checksum can be moved from one memory unit to a different memory unit by disabling checksum protections, obtaining a consistent copy of all of the data values that are to be backed up by the checksum, exclusively oring these data values, and storing the result of the exclusive or operation in the new memory unit. However, the foregoing methodology has the disadvantage of running the computer system without checksum protection for a significant time period and of consuming significant memory bandwidth, since the foregoing methodology should be performed for each checksum being moved.

Thus, a heretofore unaddressed need exists in the industry for providing a system and method for moving data values, particularly checksum values, to different memory locations of a computer system without requiring the computer system to halt execution of applications.

SUMMARY OF THE INVENTION

The present invention overcomes the inadequacies and deficiencies of the prior art as discussed hereinbefore. Generally, the present invention provides a system and method for dynamically moving checksums to different memory locations.

In architecture, the data storage system of the present invention utilizes a plurality of memory systems and a system manager. A first memory system has a first memory location that is correlated with a checksum indicator. The checksum indicator identifies the memory system that is storing the checksum of the value presently stored at the first location. The system manager dynamically moves the checksum to a destination memory location and updates the checksum indicator such that the checksum indicator identifies the memory system of the destination memory location. While the checksum is being moved, checksum updates may occur to the memory location from which the checksum was moved. Thus, after moving the checksum, the system manager updates the checksum with the value stored at the location from which the checksum was moved. As a result, the checksum stored in the checksum destination location should be sufficiently updated to enable data recovery.

The present invention can also be viewed as providing a method for dynamically moving checksums. The method can be broadly conceptualized by the following steps: providing a plurality of memory systems; storing a data value in a memory location of one of the memory systems; maintaining a checksum in another memory location of another of the memory systems; maintaining a checksum indicator that is correlated with the memory location of the one memory system and that identifies the other memory system; analyzing the checksum indicator in response to the storing a data value step; updating the checksum in response to the storing a data value step and based on the analyzing step; storing the checksum to a destination memory location; updating the checksum indicator such that the checksum indicator identifies a memory system of the destination memory location; and updating the checksum stored in the destination memory location with a data value from the other memory location of the other memory system.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
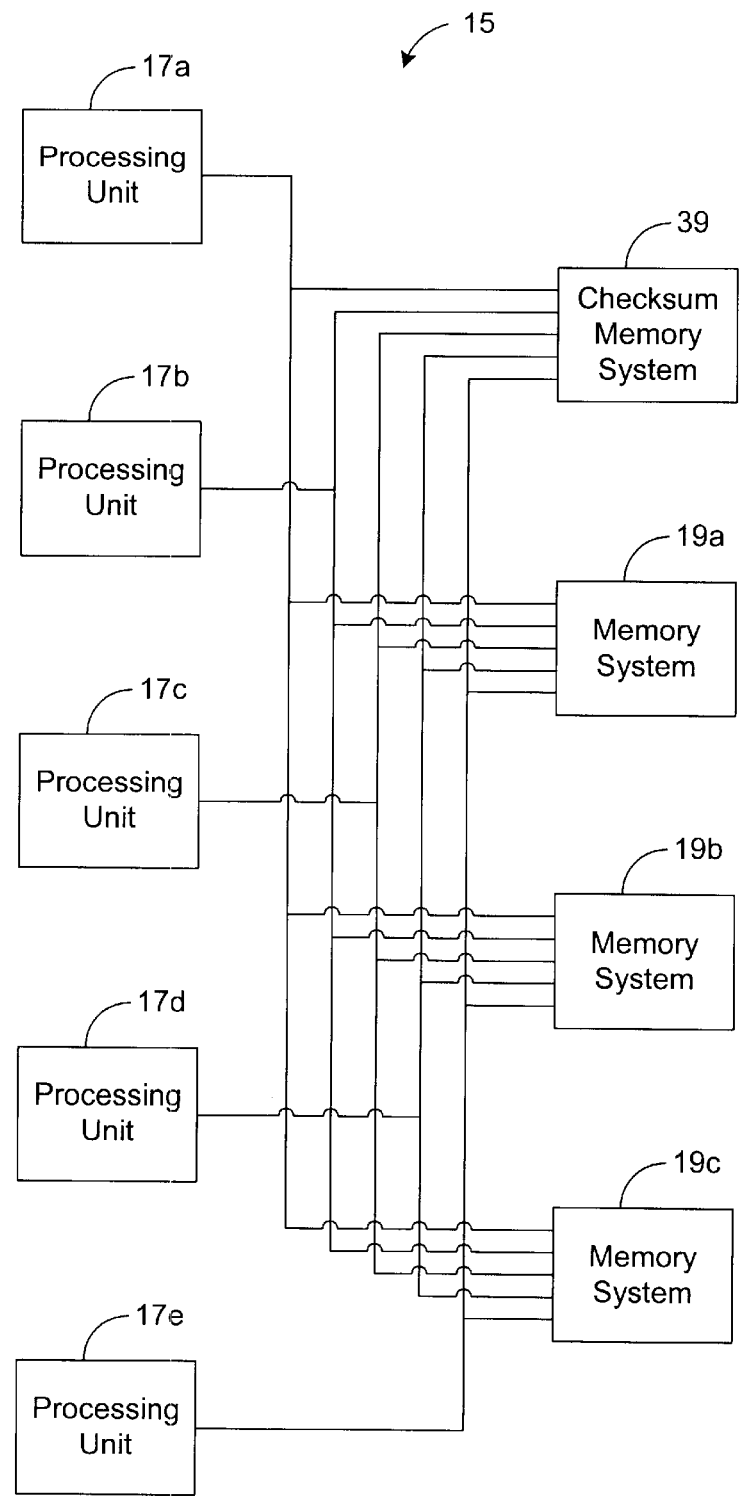
FIG. 1 is a block diagram illustrating a conventional processing system.
Figure 2:
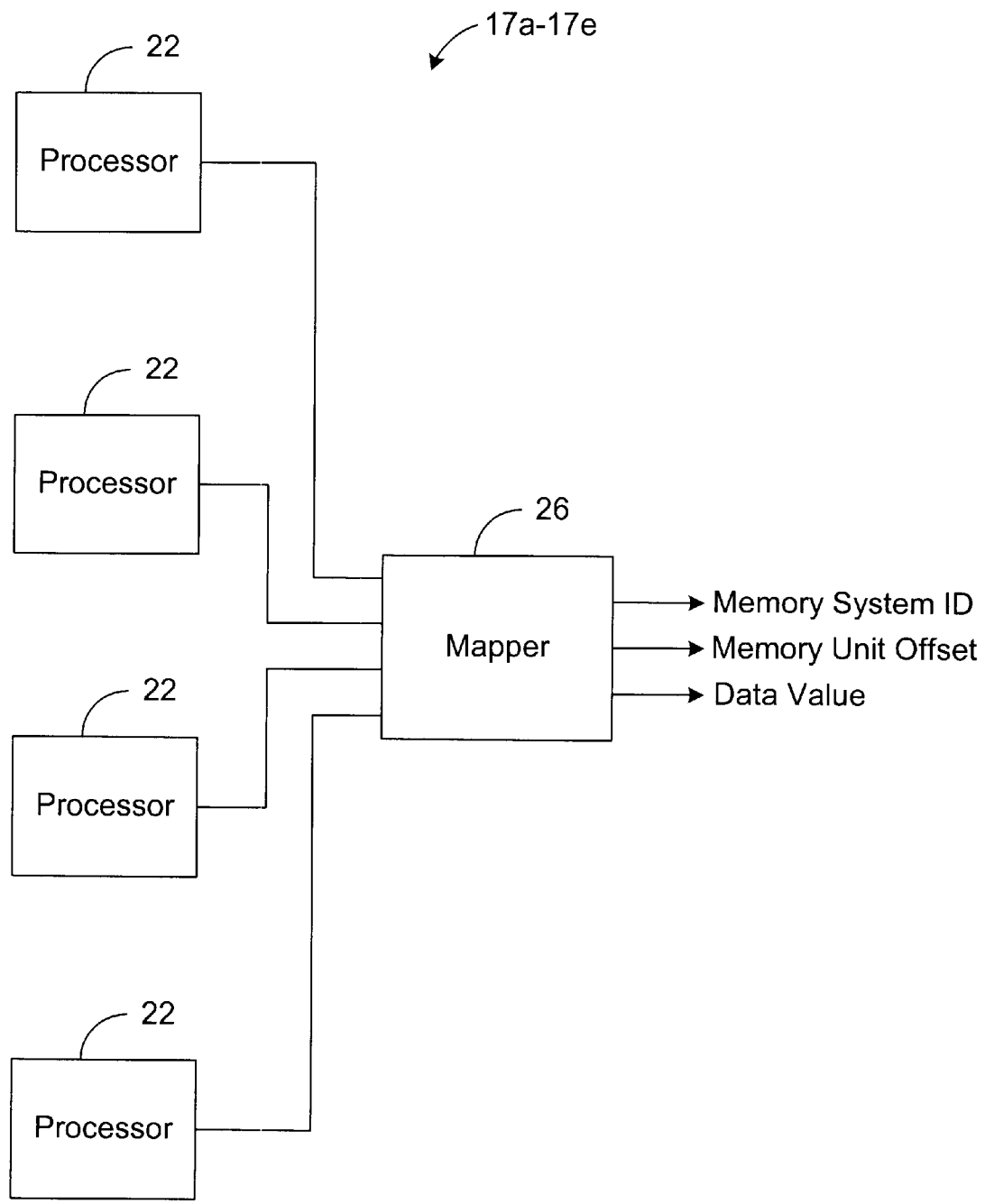
FIG. 2 is a block diagram illustrating a more detailed view of processing units depicted in FIG. 1.

FIG. 1 depicts a conventional processing system 15 including a plurality of processing units 17a–17e coupled to a plurality of memory systems 19a–19c. As shown by FIG. 2, each processing unit 17a–17e includes one or more processors 22 that are configured to execute instructions via techniques well known in the art. During execution, it is often necessary to retrieve and store data.

When a data value is to be stored in response to execution of an instruction by one of the processors 22, the processor 22 transmits a storage request to a mapper 26. The storage request includes the data value to be stored and a bus address indicative of where the foregoing data value is to be stored. The mapper 26 is configured to map the bus address into a memory unit address that includes a memory system identifier and a memory unit offset. The memory system identifier identifies one of the memory systems 19a–19c. The mapper 26 is configured to transmit a write request to each of the memory systems 19a–19c. The write request includes and is defined by the data value to be stored, the memory system identifier, and the memory unit offset.

Figure 3:
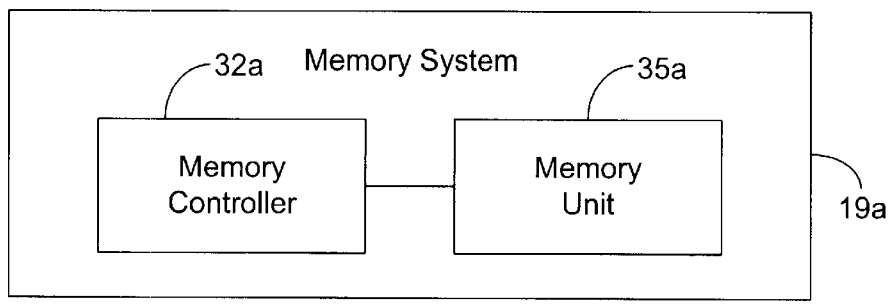
FIG. 3 is a block diagram illustrating a more detailed view of memory systems s depicted in FIG. 1.
Figure 3:
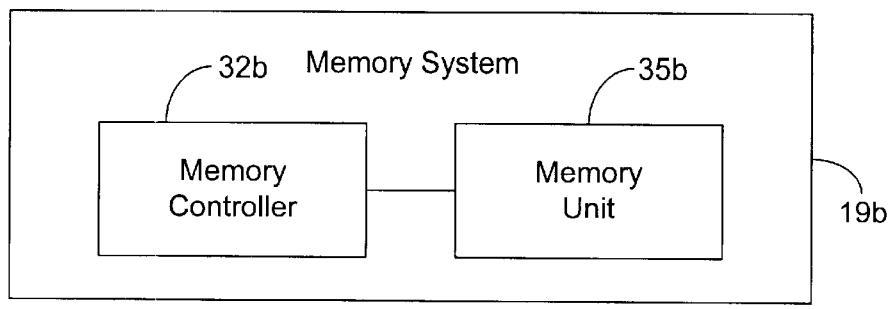
Figure 3:
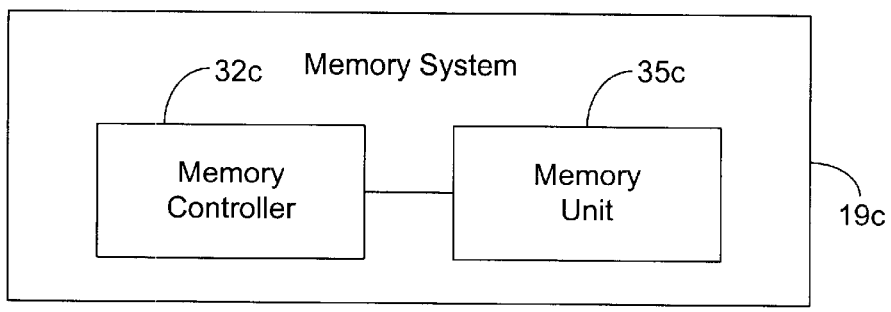
Figure 3:
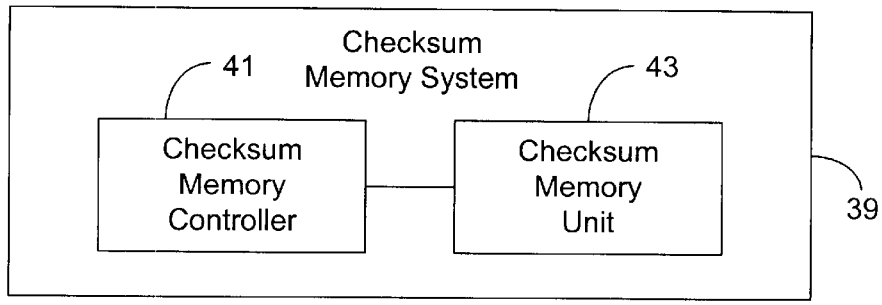

As shown by FIG. 3, each of the memory systems 19a–19c includes a memory controller 32a–32c, respectively, and a memory unit 35a–35c, respectively. Each of the memory units 35a–35c includes a plurality of memory locations where data can be stored and retrieved. The memory controller 32a–32c of the memory system 19a–19c identified by the aforementioned memory system identifier of the write request is configured to store the data value of the write request (i.e., the data value to be stored) into the memory unit 35a–35c of the identified memory system 19a–19c based on the memory unit offset. In this regard, the memory unit offset corresponds to a single location in each of the memory units 35a–35c, and the memory controller 32a–32c in the identified memory system 19a–19c is configured to store the received data value of the write request at the memory unit location corresponding to the memory unit offset.

To increase the performance of the processing system 15, the mapper 26 is configured to map consecutive bus addresses across the different memory systems 19a–19c in an interleaved fashion. For example, assume that each bus address from processors 22 is eight bits of binary information and can range from 00000000 to 11111111. The first four consecutive bus addresses are 00000000, 00000001, 00000010, and 00000011. Programmers typically utilize the bus addresses in consecutive order. Therefore, if the bus address 00000000 is initially used to store a data value, then it is likely that address 00000001 will be the next new bus address used to store data. Then, it is likely that bus address 00000010 will be used followed by bus address 00000011. This pattern is likely to be continued until no more new bus addresses are needed or until all of the bus addresses have been used.

To map the foregoing consecutive bus addresses across the memory systems 19a–19c in an interleaved fashion, the mapper 26 may map the first bus address (00000000) to a memory unit address having a memory system identifier that identifies memory system 19a. The mapper 26 may then map the second bus address (00000001) to a memory unit address having a memory system identifier that identifies memory system 19b. The mapper 26 may then map the third bus address (00000010) to a memory unit address having a memory system identifier that identifies the remaining memory system 19c. This process is repeated for each new bus address received by mapper 26. For example, when the mapper 26 receives a storage request including the fourth bus address (00000011), the mapper 26 maps the fourth bus address to a memory unit address having a memory system identifier that identifies memory system 19a.

Each bus address mapped to the same memory system 19a–19c is preferably mapped into a memory unit address having a different memory unit offset. Therefore, although a set of bus addresses is mapped to the same memory system 19a–19c, each of the bus addresses is mapped to a unique memory unit address. Accordingly, each bus address of the foregoing set is mapped to a different location in the same memory system 39a–39c.

Through techniques similar to the techniques previously described herein, data may be retrieved from the memory systems 19a–19c. In this regard, when one of the processors 22 executes an instruction to retrieve data, a retrieval request is transmitted by the processor 22 to the mapper 26 coupled to the processor 22. The retrieval request includes the bus address that indicates where the data is to be retrieved. The mapper 26 maps the bus address to a memory unit address including a memory system identifier and a memory unit offset. The memory system identifier identifies the memory system 19a–19c storing the requested data, and the memory unit offset corresponds to the location within the memory unit 35a–35c of the identified memory system 19a–19c where the data is actually stored.

The mapper 26 transmits a read request to each of the memory systems 19a–19c in response to the retrieval request. The read request includes and is defined by the foregoing memory unit address translated from the bus address of the retrieval request. The memory controller 32a–32c of the memory system 19a–19c identified by the memory system identifier of the read request retrieves the data value in the associated memory unit 35a–35c at the location corresponding to the memory unit offset of the read request. The identified memory system 19a–19c then transmits the retrieved data value to the requesting processing unit 17a–17e. In this regard, the memory controller 32a–32c may return the retrieved data value to the mapper 26, which transmits this data value to the requesting processor 22 (i.e., the processor 22 that issued the aforementioned retrieval request), or the memory controller 32a–32c may transmit the data value to the requesting processor 22 without utilizing mapper 26.

As shown by FIG. 1, the processing system 15 also includes a checksum memory system 39 coupled to the processing units 17a–17e. As shown by FIG. 3, the checksum memory system 39, in architecture, is configured similar to the other memory systems 19a–19c. More specifically, the checksum memory system 39 includes a checksum memory controller 41 and a checksum memory unit 43. The checksum memory controller 41 is designed to store and retrieve data based on a memory unit address received by the checksum memory system 39. The checksum of each memory unit location in memory systems 19a–19c corresponding to the same memory unit offset is maintained in the memory unit location of the checksum memory unit 39 corresponding to the foregoing memory unit offset.

In this regard, the values in the checksum memory unit 43 are initialized to zero. Each write request transmitted by any of the processing units 17a–17e is transmitted to the other memory systems 19a–19c. As previously set forth, the memory controller 32a–32c of the memory system 19a–19c identified by the memory unit address of a transmitted write request is configured to store a data value of the write request into a memory unit location corresponding to the memory unit offset of the memory unit address. The memory controller 32a–32c of the identified memory system 19a–19c is also designed to exclusively or the foregoing data value of the write request with the data value previously stored in the foregoing memory location (i.e., with the data value overwritten in response to the write request). The foregoing memory controller 32a–32c then transmits to the checksum memory system 39 the result of this exclusive or operation and the memory unit offset correlated with the foregoing memory location (i.e., the location in the identified memory system 19a–19c accessed in response to the write request).

The checksum controller 41 is configured to exclusively or this result with the data value presently stored in the checksum memory unit location corresponding to the received memory unit offset (i.e., the memory unit offset included in the write request). The checksum memory controller 41 then stores the result of this exclusive or operation into the foregoing location of the checksum memory unit 43 (i.e., the checksum memory unit location corresponding to the received memory unit offset). Accordingly, the location in the checksum memory unit 43 corresponding to a particular memory unit offset should be storing the checksum of the data values presently stored in the locations of memory units 35a–35c that correspond to the particular memory unit offset.

If any of the memory systems 19a–19c fail, then the data values stored in the failed memory system 19a–19c can be recovered by using the data values in the checksum memory system 39. To recover a data value stored in a failed memory system 19a–19c, each data value in each of the other operable memory systems 19a–19c at a memory unit location corresponding to the same memory unit offset is exclusively ored with the checksum data value stored in the checksum memory unit 39 at the location corresponding to the foregoing memory unit offset. The result of these exclusive or operations should be the data value stored in the failed memory system 19a–19c at the memory unit location corresponding to the same memory unit offset. Therefore, by performing the foregoing exclusive or operations for each memory unit offset, each of the data values stored in the failed memory system 19a–19c can be recovered. Using checksum values to recover data values from failed memory systems is well known in the art.

Figure 4:
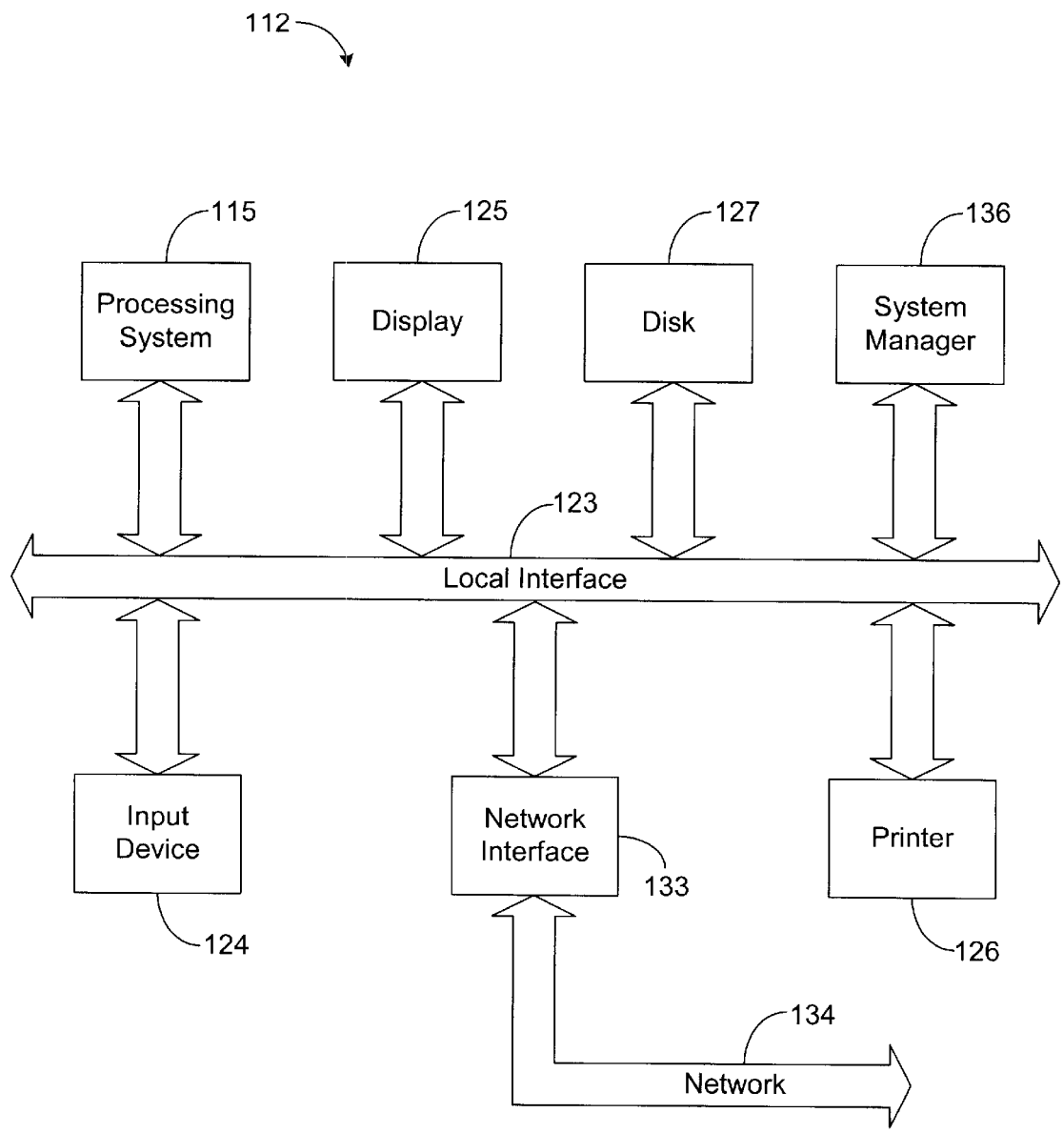
FIG. 4 is a block diagram illustrating a computer system that may be employed to implement the principles of the present invention.

The present invention generally relates to a system and method for moving checksums among different memory locations. FIG. 4 depicts a computer system 112 that may be utilized to implement the present invention. As shown by FIG. 4, the computer system 112 includes a processing system 115 configured to execute instructions of computer applications that are preferably stored in memory included in the processing system 115. The processing system 115 communicates to and drives the other elements within the computer system 112 via a local interface 123, which can include one or more buses. Furthermore, an input device 124, for example, a keyboard or a mouse, can be used to input data from a user of the system 112, and screen display 125 or a printer 126 can be used to output data to the user. A disk storage mechanism 127 can be connected to the local interface 123 to transfer data to and from a nonvolatile disk (e.g., magnetic, optical, etc.). The system 112 can be connected to a network interface 133 that allows the system 112 to exchange data with a network 134.

The computer system 112 also includes a system manager 136 that is used in the preferred embodiment to control the operation of the computer system 112, as will be described in more detail hereinafter. The system manager 136 can be implemented in software, hardware, or a combination thereof. Note that the system manager 136, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. For example, instructions defined by the system manager 136 can be executed by one or more processors in the processing system 115.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
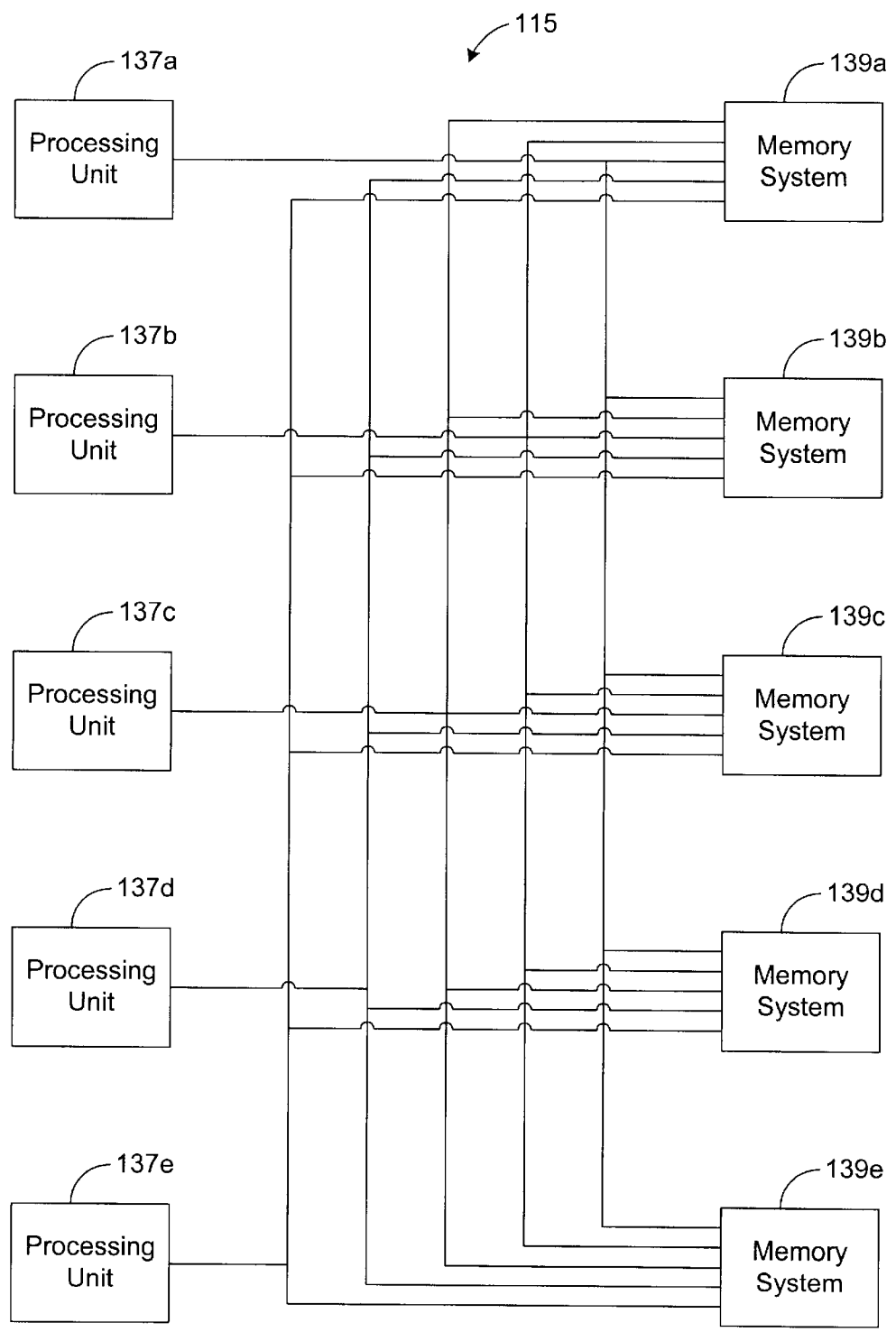
FIG.5 is a block diagram illustrating a more detailed view of a processing system depicted in FIG. 4.
Figure 6:
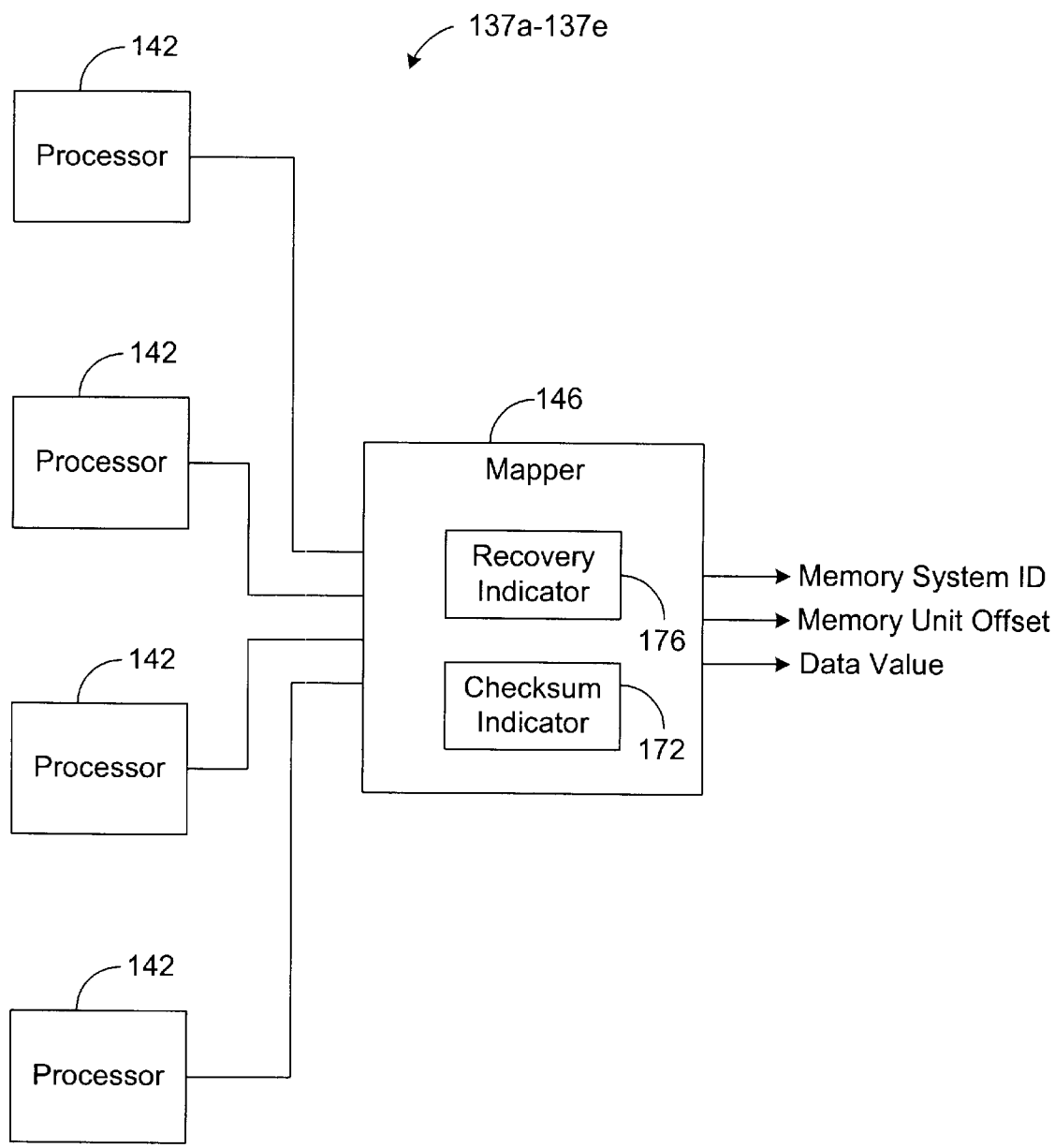
FIG. 6 is a block diagram illustrating a more detailed view of processing units depicted in FIG. 5.

As shown by FIG. 5, the processing system 115 includes a plurality of processing units 137a–137e coupled to a plurality of memory systems 139a–139e. As shown by FIG. 6, each processing unit 137a–137e includes one or more processors 142 that are configured to execute instructions via techniques well known in the art. These instructions are preferably defined by computer applications stored in one or more of the memory systems 139a–139e.

When a data value is to be stored in response to execution of an instruction by one of the processors 142, the processor 142 transmits a storage request to a mapper 146. The storage request includes the data value to be stored and a bus address indicative of where the foregoing data value is to be stored. The mapper 146 is configured to map the bus address into a memory unit address including a memory system identifier and a memory unit offset. The memory system identifier identifies one of the memory systems 139a–139e. The mapper 146 is configured to transmit a write request including the data value to be stored, the memory system identifier, and the memory unit offset to each of the memory systems 139a–139e. Note that, similar to the mapper 26 of conventional system 15, the mapper 146 preferably maps consecutive bus addresses to different memory systems 139a–139e in an interleaved fashion.

Figure 7A:
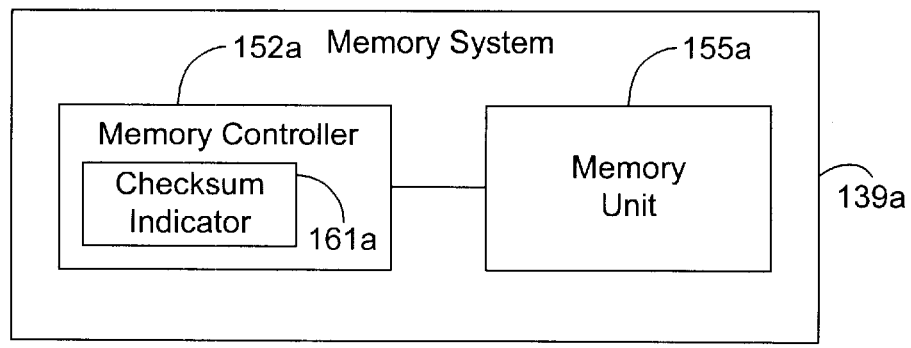
FIGS. 7A and 7B are block diagrams illustrating a more detailed view of memory systems depicted in FIG. 5.
Figure 7A:
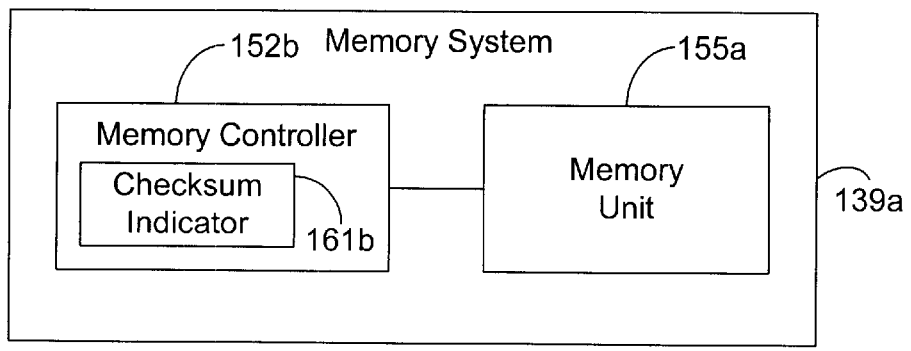
Figure 7A:
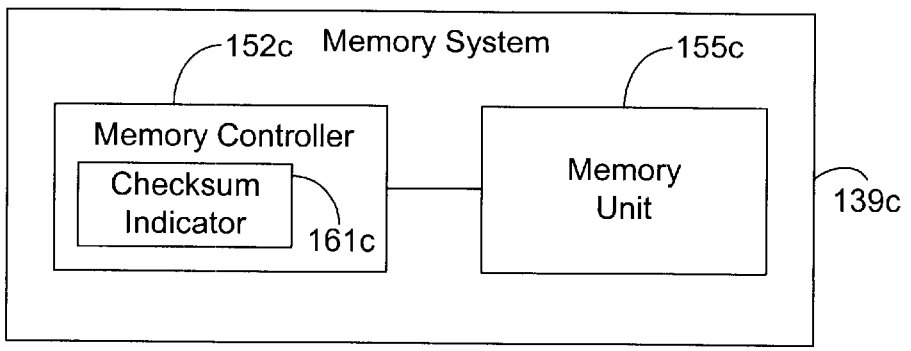
Figure 7B:
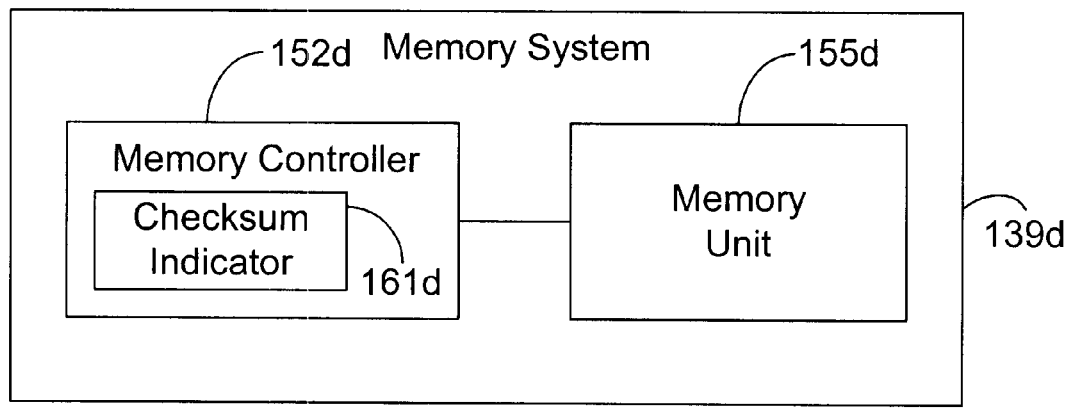
Figure 7B:
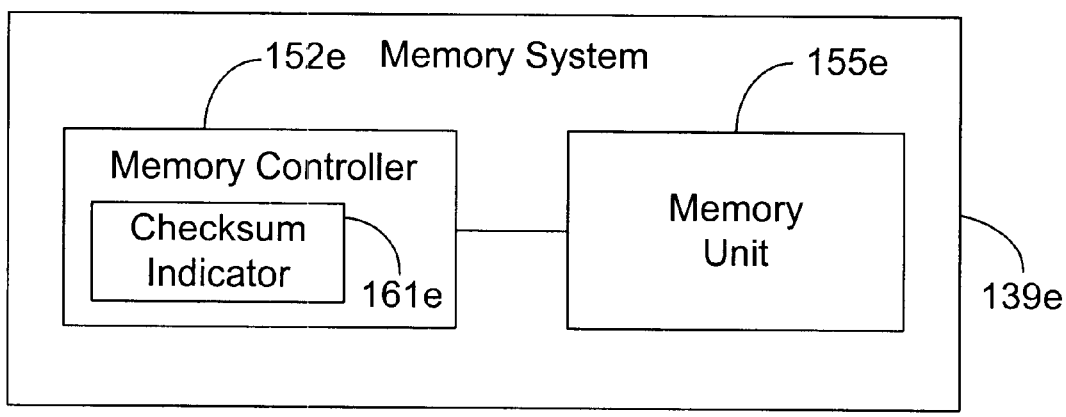

As shown by FIGS. 7A and 7B, each of the memory systems 139a–139e includes a memory controller 152a–152e, respectively, and a memory unit 155a–155e, respectively. Each of the memory units 155a–155e includes a plurality of memory locations where data can be stored and retrieved. The memory controller 152a–152e of the memory system 139a–139e identified by the aforementioned memory system identifier of the aforementioned write request is configured to store the data value to be stored (i.e., the data value received along with the memory system identifier and the memory unit offset) into the memory unit 155a–155e of the identified memory system 139a–139e based on the memory unit offset. In this regard, the memory unit offset identifies a single memory location in each of the memory units 155a–155e, and the memory controller 152a–152e in the identified memory system 139a–139e is configured to store in the foregoing memory unit 155a–155e the received data value at the location identified by the memory unit offset.

Each bus address mapped to the same memory system 139a–139e is preferably mapped into a memory unit address having a different memory unit offset. Therefore, although a set of bus addresses is mapped to the same memory system 139a–139e, each of the bus addresses is mapped to a unique memory unit address. Accordingly, each bus address mapped to the same memory system 139a–139e is mapped to a different location in the same memory system 139a–139e.

Through techniques similar to the techniques previously described herein, data may be retrieved from the memory units 155a–155e. In this regard, when one of the processors 142 executes an instruction to retrieve data, a retrieval request is transmitted by the processor 142 to the mapper 146 coupled to the processor 142. The retrieval request includes the bus address that indicates where the data is to be retrieved. The mapper 146 maps the bus address to a memory unit address including a memory system identifier and a memory unit offset. The memory system identifier identifies the memory system 139a–139e storing the requested data, and the memory unit offset identifies the location within the memory unit 155a–155e of the identified memory system 139a–139e where the data is actually stored.

The mapper 146 transmits a read request to each of the memory systems 139a–139e in response to the retrieval request. The read request includes the foregoing memory unit address translated from the bus address of the retrieval request. The memory controller 152a–152e of the identified memory system 139a–139e retrieves the data value in the associated memory unit 155a–155e at the location identified by the memory unit offset and transmits this data value to the requesting processing unit 137a–137e. In this regard, the memory controller 152a–152e may return the foregoing data value to the mapper 146, which transmits this data value to the requesting processing unit 137a–137e, or the memory controller 152a–152e may transmit the data value to the requesting processing unit 137a–137e without utilizing mapper 146.

Figure 8:
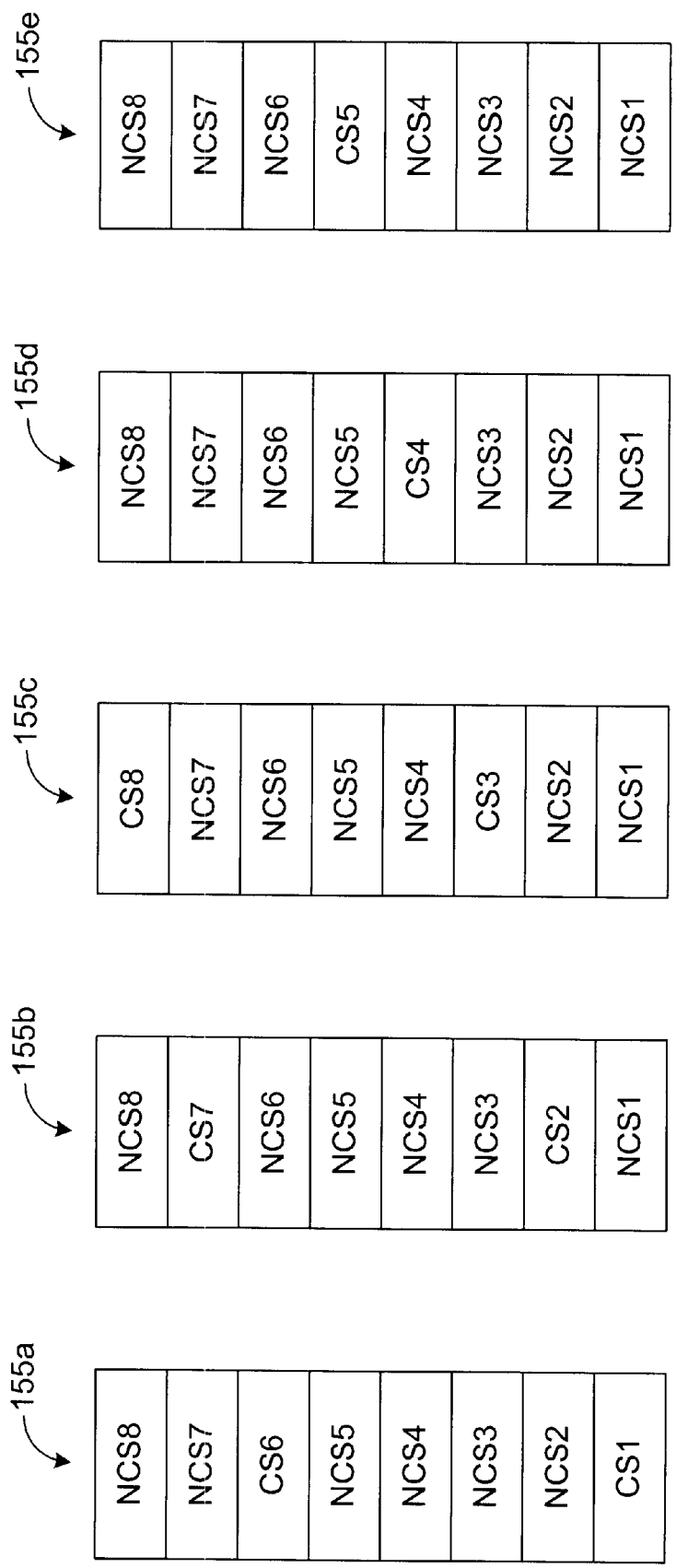
FIG. 8 is a block diagram illustrating a more detailed view of memory units depicted in FIGS. 7A and 7B.

FIG. 8 depicts a more detailed view of each of the memory units 155a–155e. In FIG. 8, checksum values or checksums are stored within portions CS1–CS8 and non-checksum values are stored within portions NCS1–NCS8. As in conventional system 15, each checksum value within one of the memory systems 139a–139e represents the checksum for each data value stored at the memory locations that are within the other memory systems 139a–139e and that are correlated with the same memory unit offset as the memory location of the checksum value. However, the checksums are interleaved across the different memory systems 139a–139e, as shown by FIG. 8, for example.

Referring to FIG. 8, assume that the memory locations within portion CS1 ("checksum 1") of memory unit 155a are correlated with the same memory unit offsets as the memory locations within portions NCS1 ("non-checksum 1") of memory units 155b–155e. Therefore, the checksum of the values within portions NCS1 at memory locations correlated with the same memory unit offset should be stored in portion CS1 at the memory location that is correlated with the foregoing memory unit offset. Similarly, assume that the memory locations within portions CS2–CS8 are correlated with the same memory unit offsets as the memory locations within portions NCS2–NCS8, respectively. Thus, the checksums of the values within portions NCS2–NCS8 should be stored in portions CS2–CS8, respectively. For example, the checksum of the values within portions NCS2 at memory locations correlated with the same memory unit offset should be stored in portion CS2 at the memory location that is correlated with the foregoing memory unit offset, and the checksum of the values within portions NCS3 at memory locations correlated with the same memory unit offset should be stored in portion CS3 at the memory location that is correlated with the foregoing memory unit offset.

Thus, instead of having the checksums stored within a single memory unit 43 (FIG. 3) as in conventional system 15, the checksums are stored in different memory units 155a–155e. As a result, checksum updates may be interleaved across the memory units 155a–155e. U.S. patent application Ser. No. 09/699,877, entitled "Data Storage System and Method," and filed on Oct. 30, 2000, which is incorporated herein by reference, describes in more detail how the system 115 can be configured to enable checksums to be interleaved across the memory units 155a–155e, as shown by FIG. 8. It should be noted that the techniques for moving checksums, which will be described in further detail hereinafter, may be employed when the checksums are stored in the same memory unit 43 (FIG. 3), as described for conventional system 15.

To better illustrate how checksums are maintained within memory units 155a–155e, assume that memory system 139b receives a write request for storing a data value at one of the memory locations in portion NCS1 of memory unit 155b. As described hereinbefore, the one memory location (referred to hereafter as the "destination") within portion NCS1 should be correlated with a particular memory unit offset. The checksum of the value already stored at the destination before the occurrence of the write request should be stored in portion CS1 of memory unit 155a at the memory location (referred to hereafter as the "checksum location") correlated with the same memory unit offset.

In response to the write request, the memory controller 152b exclusively ors the data value of the write request (i.e., the data value to be stored) with the data value previously stored in the destination and then stores, in the destination, the data value of the write request. The result of the exclusive or operation is then transmitted by the memory controller 152b in a second write request, which identifies the memory controller 152a of the memory system 139a that includes the checksum location. In this regard, this second write request includes a memory system identifier identifying the memory system 139a, the result of the exclusive or operation, and the memory unit offset correlated with the destination.

This write request is transmitted to each of the other memory systems 139a and 139c–139e by the memory controller 152b. In response to the write request, the memory controller 152a exclusive ors the checksum stored at the checksum location with the exclusive or result transmitted from memory controller 152b. The result of the exclusive or operation performed by memory controller 152a is then stored in the checksum location. As a result, the checksum at the checksum location has been updated for the data value that is stored in the destination in response to the write request.

As described above, when a memory controller 155a–155e stores a data value in a destination memory location in response to a write request from mapper 146, the memory controller 155a–155e should exclusive or the data value to be stored with the data value previously stored in the destination memory location. The result of this exclusive or operation should then be transmitted to the memory system 139a–139e that is storing the checksum associated with the destination location so that the checksum may be updated.

To enable identification of which memory system 139a–139e is storing the checksum associated with the destination location, the memory controllers 152a–152e preferably maintain checksum indicators 161a–161e, respectively, as shown by FIGS. 7A and 7B. Each checksum indicator 161a–161e, for each particular memory location within the memory system 139a–139e maintaining the checksum indicator 161a–161e, indicates which memory system 139a–139e is storing the checksum of the data value presently stored in the particular memory location.

Thus, in the example described above in which the memory controller 152b receives a write request, the checksum indicator 161b maintained by the memory controller 152b should indicate that memory system 139a is storing the checksum associated with the destination (i.e., is storing a checksum at a memory location correlated with the same memory unit offset as the destination). Therefore, after the memory controller 152b exclusive ors the data value to be stored in the destination with the data value previously stored in the destination, the memory controller 152b analyzes the checksum indicator 161b to determine which of the other memory systems 139a and 139c–39e is storing the checksum associated with the destination. Based on the checksum indicator 161b, the memory controller 152b should identify memory system 139a and transmit to the memory controller 152a the result of the exclusive or operation performed by the memory controller 152b. In response, the memory controller 152a updates the checksum associated with the destination based on the exclusive or result, as described above.

Figure 9:
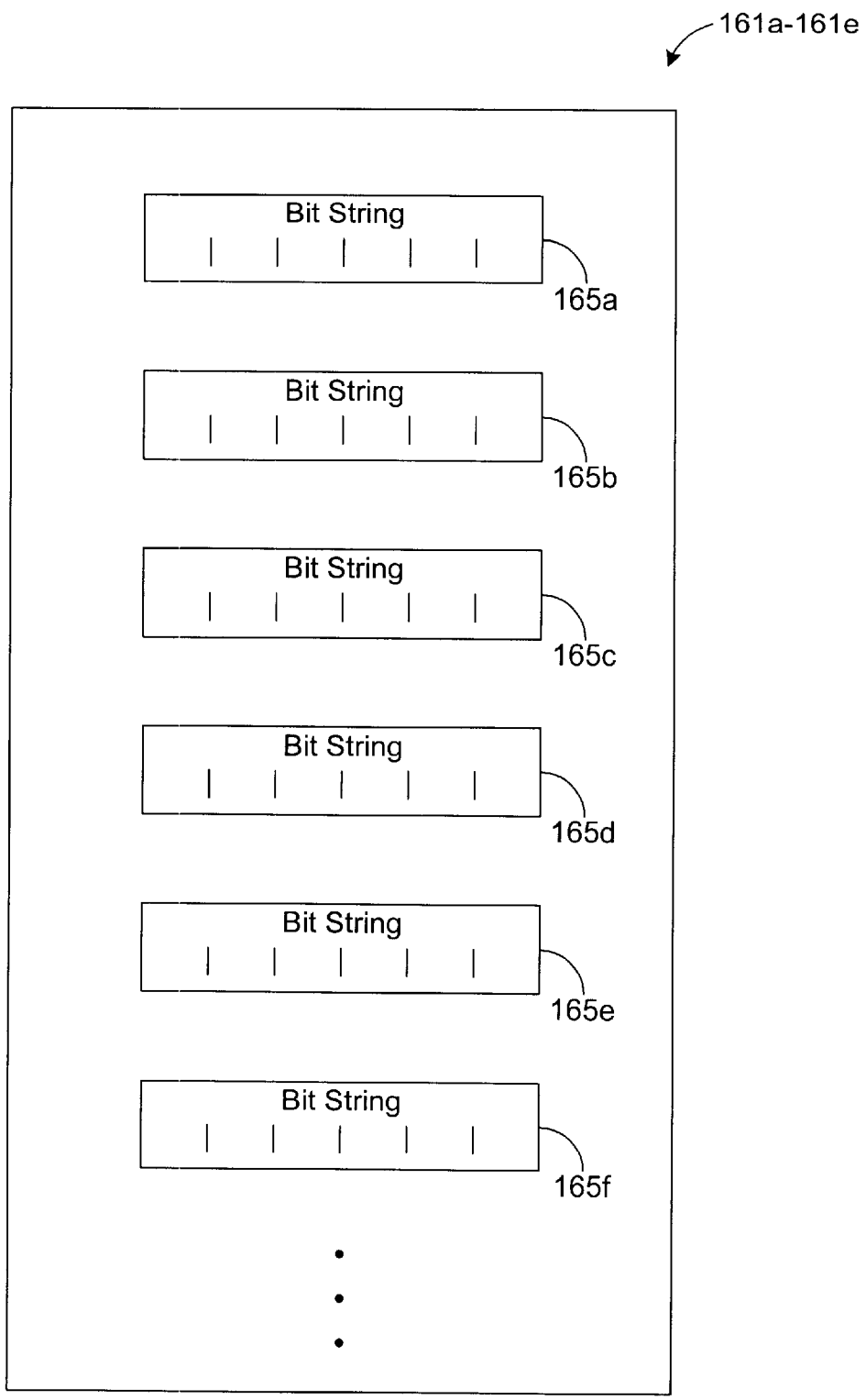
FIG. 9 is a block diagram illustrating a more detailed view of any one of the checksum indicators depicted in FIGS. 7A and 7B.

The checksum indicators 161a–161e can be implemented via various techniques. In the preferred embodiment as shown by FIG. 9, each checksum indicator 161a–161e is implemented as a plurality of bit strings 165a–165f, one bit string 165a–165f for each memory location having a different memory unit offset. Each bit string 165a–165f preferably has a number, n, of bits, in which n corresponds to the number of memory systems 139a–139e within the processing system 115. In the embodiment shown by FIG. 5, the system 115 includes five memory systems 139a–139e, and each bit string 165a–165f of each checksum indicator 161a–161e should, therefore, include five active bits. Each active bit within each bit string 165a–165e corresponds to one of the memory systems 139a–139e.

In the aforementioned example in which the memory system 139b receives the write request from mapper 146, the bit string 165a–165f of the checksum indicator 161b should be appropriately set to indicate that the memory system 139a is storing the checksum associated with the destination. In this regard, assume that bit string 165f is correlated with the destination. Within the bit string 165f, the bit corresponding to the system 139a is preferably asserted, and the remainder of the bits in the bit string 165f are preferably deasserted. Therefore, by determining which of the bits of bit string 165f is asserted, the memory controller 152b can determine that memory system 139a is storing the checksum associated with the destination. Thus, the memory controller 152b should be aware that the memory system 139a is storing the checksum that should be updated based on the result of the exclusive or operation performed by the memory controller 152b.

Any bit string 165a–165f correlated with a memory location that is storing a checksum preferably identifies the memory system 139a–139e that includes the foregoing memory location. Thus, in the checksum indicator 161a of the foregoing example, the bit string 165f correlated with the checksum location in memory unit 155a preferably includes five bits corresponding respectively with memory systems 139a–139e. The bit corresponding with memory system 139a is preferably asserted to indicate that memory system 139a is storing a checksum at the correlated location (i.e., at the checksum location). Note that if the checksum location was storing a nonchecksum value instead of a checksum value, then the foregoing bit would be deasserted.

Moreover, when the memory controller 152a receives the exclusive or result transmitted from memory controller 152b, the memory controller 152a in analyzing the aforementioned bit string 165f of checksum indicator 161a can determine that the received write request is for the purpose of updating a checksum instead of storing the data value included in the write request. Therefore, instead of storing the data value included in the received write request and attempting to update a checksum in another memory system 139b–139e, the memory controller 152a updates the checksum stored at the checksum location according to the aforementioned techniques. In this regard, the memory controller 152a exclusively ors the data value included in the received write request with the checksum previously stored in the checksum location and then stores the result of this exclusive or operation in the checksum location.

In the preferred embodiment, any bit string 165a–i65f correlated with a memory location storing a checksum also indicates which memory systems 139a–139e are active. As used herein, an "active" memory system refers to a memory system 139a–139e that is presently being used to store and retrieve data in response to requests from any of the processors 142 of the system 115. Thus, in the checksum indicator 161a of the foregoing example, each bit of the bit string 165f that is correlated with the checksum location is asserted, assuming that memory systems 139a–139e are all active. The asserted bit corresponding to memory system 139a indicates that memory system 139a is storing a checksum at the location correlated with the bit string 165f, and the asserted bits corresponding with memory systems 139b–139e indicate that memory systems 139b–139e are active. If memory systems 139c and 139d are active and memory system 139b is inactive, then only the bits corresponding with memory systems 139a, 139c, and 139d should be asserted. By analyzing the foregoing bit string 165f in such an example, it should be apparent that memory system 139a is storing a checksum at the location correlated with the bit string 165f and that memory systems 139c and 139 are active.

By maintaining a bit string 165a–165f for each memory location as described above, each memory controller 152a–152e can appropriately handle each write request transmitted from mapper 146, including appropriately updating the checksums stored within the system 115. However, it should be emphasized that there are various other methodologies and configurations that may be employed to indicate which memory locations are storing the checksums that should be updated in response to write requests from mapper 146, and there are various other methodologies and configurations that may be employed to indicate which memory systems 139a–139e are active. Any technique for indicating the locations of the checksums and for appropriately updating the checksums should be sufficient for implementing the present invention.

Once a data value stored in one of the memory systems 139a–139e is lost (e.g., when the memory system 139a–139e storing the data value fails), the lost data value may be recovered by utilizing the checksum associated with the memory location of the lost data value and by utilizing the data values stored in the other active memory systems 139a–139e. In this regard, assume that each memory system 139a–139e is active and that a checksum is stored in a location ("checksum location") of memory system 139a when memory system 139b fails. The data value stored in the system 139b at the location having the same memory unit offset as the checksum location (i.e., the data value in the system 139b at the location associated with the checksum location) may be recovered by exclusively oring the checksum at the checksum location with the data values presently stored in active memory systems 139c–139e at locations having the same memory unit offset as the checksum location.

To better illustrate this process, assume that the mapper 146 is configured to recover the lost data value in response to a command transmitted from system manager 136. The mapper 146 may include a checksum indicator 172 indicating which of the memory systems 139a–139e is storing the checksum that may be used to recover the lost data value. In this case, the indicator 172 should identify memory system 139a since the checksum associated with the memory location of the lost data value is stored in system 139a. There are a variety of methodologies that may be employed to identify the appropriate memory system 139a–139e that is storing the checksum associated with the memory location of the lost data value.

For example, for each possible memory unit offset, the checksum indicator 172 may include a bit string (not shown)

having a bit for each memory system 139a–139e, similar to the checksum indicators 161a–161e stored in memory systems 139a–139e. Each bit string is correlated with a different memory unit offset, and the bit string correlated with the same memory unit offset as the memory location of the lost data value is preferably used to indicate which memory system 139a–139d is storing the checksum associated with the memory location of the lost data value. In the bit string used to indicate which memory system 139a–139e is storing such a checksum, the bit corresponding to the memory system 139a–139e that is storing the foregoing checksum is preferably asserted, and the remaining bits are preferably deasserted. Therefore, for any lost data value, the mapper 146 may analyze the checksum indicator 172 to determine which of the memory systems 139a–139e is storing the checksum associated with the memory location of the lost data value.

Thus, in the foregoing example in which the mapper 146 is configured to recover the lost data value stored in memory system 139b, the mapper 146 analyzes the checksum indicator 172 and determines that memory system 139a is storing the checksum associated with the memory location of the lost data value. In response, the mapper 146 preferably transmits a command to memory system 139a instructing the memory controller 152a to recover the lost data that was stored in memory system 139b. Included in this command is the memory unit offset of the location where the lost data value was stored and a memory system identifier identifying the memory system 139b that was storing the lost data value.

In response, the memory controller 152a analyzes the checksum indicator 161a to determine which of the other memory systems 139c–139e are active. According to the techniques previously described for the preferred embodiment, the identification of the active memory systems 139c–139e is achieved by analyzing the checksum indicator 161a. In this regard, the memory controller 152a analyzes the bit string 165a–165f correlated with the checksum location, which is storing the checksum associated with the memory location of the lost data value. The checksum location should be the location within memory unit 155a that is correlated with the memory unit offset included in the aforementioned command received from mapper 146.

After identifying the other active memory systems 139c–139e, the memory controller 152a then requests retrieval of the data values in the active memory systems 139c–139e at locations corresponding to the same memory unit offset as the checksum location. The retrieved data values are then exclusively ored with the checksum stored in the checksum location of the memory system 139a. The result of this exclusive or operation should be the lost data value. After recovering the lost data value, the lost data value may be transmitted to mapper 146, stored in another memory location, or otherwise handled as desired.

Note that there are times when it may be desirable to delay or prevent the process of recovering a lost data value. For example, when moving a checksum from one memory location to another, it may be desirable to delay any data recovery process that utilizes the checksum until the checksum is safely stored in its destination location. Thus, the mapper 146 preferably includes a recovery indicator 176 that enables and disables recovery processes. The recovery indicator 176 may be a bit string (not shown) that includes a bit for each data memory location within memory systems 139a–139e. If a recovery process utilizing one of the checksums stored in the memory systems 139a–139e should be delayed or prevented, then the bit of the recovery indicator 176 corresponding with the location of the checksum may be asserted to indicate that any such recovery process is disabled. Once the foregoing checksum may be used for a data recovery process, the foregoing bit may be deasserted to indicate that any such process is enabled.

There are a variety of situations when it may be desirable to move a checksum from one memory location to another memory location. For example, as described in the Background of the Invention section, it may be desirable to remove one of the memory units 155a–155e in one of the memory systems 139a–139e. Therefore, the contents of the memory unit 155a–155e that is to be removed should be moved to another memory unit 155a–155e. U.S. patent application Ser. No. 09/675,021, entitled "System and Method for Dynamically Reallocating Memory in a Computer System," and filed on Sep. 28, 2000, which is incorporated herein by reference, describes techniques that may be employed to dynamically move data values from one memory location to another memory location. As used herein, the term "dynamic" shall be defined to refer to an occurrence in the computer system 112 while one or more computer applications are simultaneously running on one or more of the processing units 137a–137e and accessing data values from one or more memory systems 139a–139e. Thus, the foregoing application describes techniques that may be used to reallocate memory within mapping systems 139a–1 39e as data is being stored and retrieved from the mapping systems 139a–139e.

In systems that maintain checksums to backup data, such as in processing system 115, care should be taken to ensure that the data stores occurring during a dynamic checksum move do not cause data errors. In this regard, assume that a checksum is being moved from memory system 139a to memory system 139e. Since each particular checksum value should represent the checksum of data values stored in memory locations correlated with the same memory unit offset as the checksum memory location of the particular checksum value, the checksum being moved should be stored in the memory system 139e at a location that is correlated with the same memory unit offset as the checksum memory location in memory system 139a from which the checksum is moved.

While the checksum is being moved, a data store to any of the other memory systems 139b–139d may cause the generation of a write request to update the checksum being moved. For example, memory system 139b may receive a request to write a data value to memory unit 155b at a location having the same memory unit offset as the checksum source location that is storing the checksum being moved. In response, the memory controller 152b may attempt to update the checksum being moved by transmitting a write request identifying memory system 139a, and such a write request may be received by the memory system 139a just after the checksum has been read out of the memory system 139a. In such a case, it is possible that the checksum will not be updated based on the foregoing write request, unless additional steps are taken to ensure that the checksum already read out of the memory system 139a is properly updated.

In an attempt to solve the foregoing problem, the memory system 139b could be configured to identify the destination memory system 139e in the write request instead of identifying the source memory system 139a from which the checksum is being moved. However, it is possible for the write request to be received by the destination memory system 139e before the checksum is actually written to its destination location in the memory system 139e. Thus, unless steps are taken to ensure that the write request is not satisfied before the checksum is actually written into the memory system 139e, it is possible that the checksum will not be appropriately updated. The following is a detailed description of how checksums can be dynamically moved within system 115 while ensuring that checksum updates to the checksums being moved are appropriately satisfied. To illustrate the foregoing, assume that a checksum stored in a memory location (referred to hereafter as the "checksum source location") of memory unit 155a is to be dynamically moved to a memory location (referred to hereafter as the "checksum destination location") of memory unit 155e. Also, assume, for illustrative purposes, that the system manager 136 (FIG. 4) is configured to control the checksum move operations by issuing commands to the appropriate components of system 112. It should be noted that the hardware and/or software utilized to implement the system manager 136 may be located at various locations within the system 112, including within processing system 115. Furthermore, any methodologies for controlling the checksum move operations other than those expressly described herein may be employed without departing from the principles of the present invention.

Figure 10:
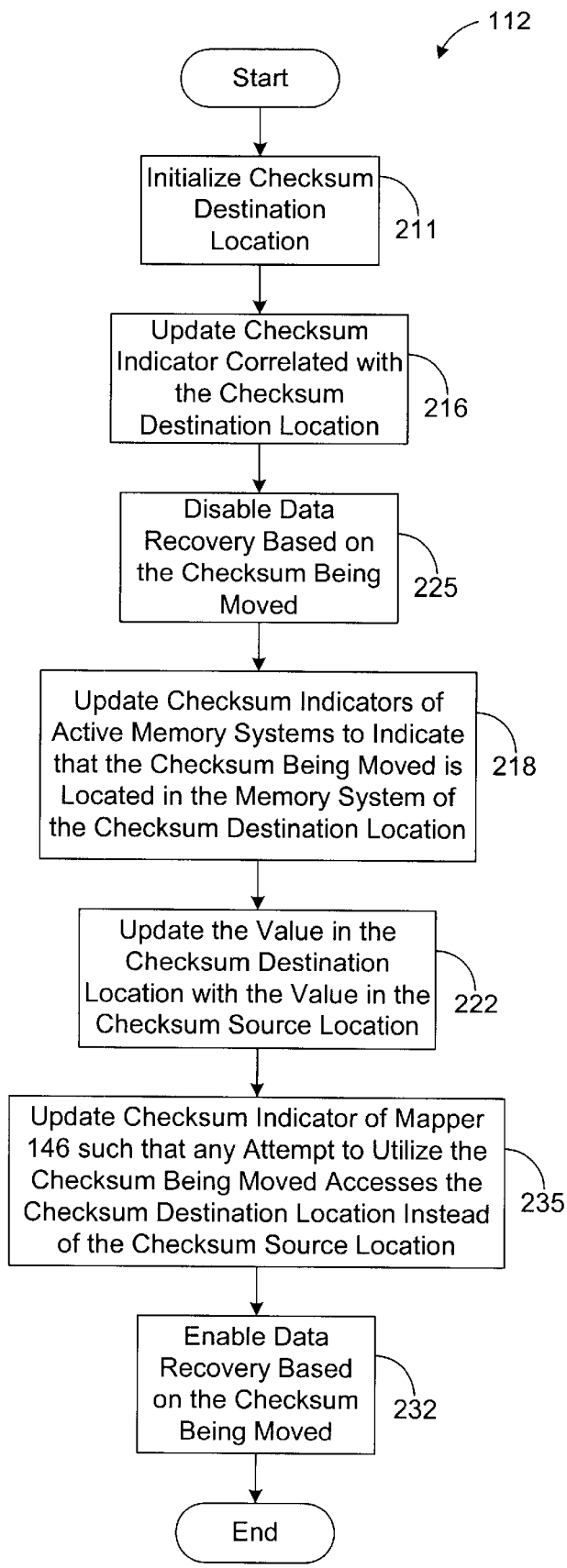
FIG. 10 is a flow chart illustrating the architecture and functionality of the computer system depicted by FIG. 4 in moving a checksum to a different memory location.

FIG. 10 depicts the architecture and functionality of the system 112 in moving a checksum from one memory location to another memory location. As shown by block 211 of FIG. 10, the checksum destination location of memory unit 155e is preferably initialized by storing the value of zero (0) into the checksum destination location. In this regard, the system manager 136 may transmit to memory controller 152e a command instructing the memory controller 152e to write the value of zero into the checksum destination location. At this point, the checksum destination location is not part of the checksum set and, therefore, the current checksum source location is not updated due to the initialization of the checksum destination location.

It should be noted that the transmission of any command described herein as being transmitted to any of the memory systems 139a–139e or mapper 146 may be implemented via various techniques. For example, control lines (not shown) may transmit any such command directly to a memory system 139a–139e or to mapper 146 without utilizing processors 142. Alternatively, the system manager 136 could transmit one or more instructions to one or more processors 142 that, when executed, command the memory system 139a–139e or mapper 146 to perform the desired functionality. As an example, to command memory controller 152e to initialize the checksum destination location, the system manager 136 may transmit an instruction to a processor 146 that, when executed, generates a storage request for storing a value of zero in the checksum destination location. This storage request may then be processed according to the techniques previously described herein to cause the memory controller 152e to initialize the checksum destination location.

As shown by block 216, the checksum indicator 161e of the memory system 139e of the checksum destination location should be appropriately updated to indicate that the checksum destination location is storing a checksum value and to indicate which of the other memory systems 139a–139e are active. In the present example, assume that memory systems 139b and 139c are active and that memory system 139d is inactive. Note that memory system 139a should be active since it is presently storing the checksum that is to be moved. Also assume that bit string 165f of checksum indicator 161e is correlated with the checksum destination location. Thus, bit string 165f of checksum indicator 161e should be set such that the bits corresponding to memory systems 139a, 139b, 139c, and 139e are asserted and such that the bit corresponding to memory system 139d is deasserted. This may be accomplished by transmitting an appropriate command from the system manger 136 to the memory controller 152d.

While implementing blocks 218 and 222, which will be described in further detail hereinafter, the checksum being moved from the checksum source location to the checksum destination location may not yet be updated as necessary to enable data recovery. Thus, in block 225, attempts to utilize the checksum being moved for recovering lost data are preferably disabled. In the preferred embodiment, the foregoing is accomplished by setting the recovery indicator 176 in mapper 146 to indicate that any data recovery process that utilizes the data stored at the source checksum location in memory system 139a is disabled. More specifically, the data bit in the recovery indicator 176 corresponding to the checksum source location is asserted. Therefore, any attempt to recover lost data based on the checksum being moved should be disabled during blocks 218 and 222.

In this regard, assume that an attempt to recover a lost data value at a memory location correlated with the same memory unit offset as the source checksum location occurs during the occurrence of block 218 or 222. According to the techniques previously described herein for recovering lost data values, the checksum indicator 172 of the mapper 146 should be analyzed to determine where the checksum of the lost data value is stored. In this example, the checksum indicator 172 should indicate that memory system 139a is storing the checksum. Thus, before an attempt to recover the lost data value is attempted, the recovery indicator 176 should be analyzed to determine whether any attempt to recover the lost data value is enabled. Since the recovery indicator 176 has been set in block 225 to indicate that such an attempt is disabled, the attempt should be prevented. The attempt may be retried at a later time.

Once the recovery indicator 176 has been appropriately set in block 225, the checksum indicators 161a–161c of the active memory systems 139a–139c are then set, in block 218, to indicate that the memory system 139e of the checksum destination location is storing the checksum for the memory locations correlated with the same memory unit offset as the checksum destination location. Assume that bit string 165f in each checksum indicator 161a–161c is correlated with the memory locations of systems 139a–139c, respectively, that have the same memory unit offset as the checksum destination location. Therefore, in the preferred embodiment, checksum indicators 161a–161c are updated in block 218 by asserting the bit corresponding to memory system 139e in bit strings 165f of checksum indicators 161a–161c and by deasserting the remaining bits in the foregoing bit strings 165f. The bit strings 165f may be set by transmitting a command from the system manager 136 to each memory controller 152a–152e or by some other suitable technique.

While the checksum indicators 161a–161c are being appropriately set in block 218, checksum updates to the checksum being moved may occur. These checksum updates may update the value stored at the checksum destination location or at the checksum source location depending on the progression of block 218. For example, assume that a first data value and a second data value are respectively stored in memory systems 139b and 139c at locations correlated with the same memory unit offset as checksum source and destination locations. Also assume that the checksum indicator 161b in memory system 139b has been updated in block 218 but that the checksum indicator 161c in memory system 139c has yet to be updated in block 218. In other words, block 218 is not yet complete.

In storing the first data value into memory unit 155b, memory controller 152b analyzes its checksum indicator 161b and determines that memory system 139e is storing the checksum that should be updated based on the first data value. In this regard, the bit corresponding to memory system 139e in bit string 165f of checksum indicator 161b is asserted, and the remaining bits in the foregoing bit string 165f are asserted. Thus, the memory controller 152b exclusively ors the first data value with the data value already stored in the first data value's destination and transmits a write quest that includes the result of this exclusive or operation and that identifies memory system 139e. In response to this request, the memory controller 152e should exclusive or the result included in the request with the data value presently stored in the checksum destination location and should store the result of the exclusive or operation performed by the memory controller 152e into the checksum destination location.

In storing the second data value into memory unit 155c, memory controller 152c analyzes its checksum indicator 161c and determines that memory system 139a is storing the checksum that should be updated based on the second data value. In this regard, the bit corresponding to memory system 139a in bit string 165f of checksum indicator 161a is asserted, and the remaining bits in the foregoing bit string 165f are deasserted. Thus, the memory controller 152c exclusively ors the second data value with the data value already stored in the second data value's destination and transmits a write request that includes the result of this exclusive or operation and that identifies memory system 139a. In response to this request, the memory controller 152a should exclusive or the result included in the request with the data value presently stored in the checksum source location and should store the result of the exclusive or operation performed by the memory controller 152a into the checksum source location.

At this point, neither the value presently stored in the checksum source location nor in the checksum destination location is sufficient for recovering data values, since neither of the values is a complete checksum representation for memory systems 139b and 139c. However, this should not cause any errors since any attempt to recover the data values in memory systems 139b and 139c at memory locations correlated with the same memory unit offset as the checksum source and destination locations should be disabled as a result of block 225. Also, it should be noted that no checksum information has been lost. A valid checksum can be generated by exclusively oring the values at the checksum source location and the checksum destination location.

After completing block 232, which will be described in further detail hereinafter, a complete checksum representation of the first and second data values stored in active memory systems 139b and 139c should be stored in the checksum destination location, assuming that no other attempts to update the checksum being moved occur in blocks 218 and 222. Thus, attempts to recover the first and second data values stored in active memory systems 139b and 139c may be enabled after block 232, if it can be ensured that such attempts will utilize the complete checksum representation stored in the checksum destination location to recover the data values.

After completing block 218, the value stored in the checksum source location is exclusively ored with the value stored in the checksum destination location, as shown by block 222. The result of this exclusive or operation is then stored in the checksum destination location. The foregoing may be achieved by transmitting a command from system manager 136 to memory system 139a instructing the memory controller 152a to retrieve the value at the checksum source location and to transmit the retrieved value to memory system 139e in a command or request that instructs the memory controller 152e to perform the functionality described above. A simple mechanism to accomplish this task would be to mark the source checksum location as a data location with the destination checksum location identified in the bit string 165f of the checksum indicator 161a. A write of data containing all zeroes will use the normal checksum write flow to exclusive or the source checksum information with the destination checksum information.

After completing block 222, a complete checksum representation of the data values stored in the active memory systems 139b and 139c at the locations correlated with the same memory unit offset as the checksum destination location should be stored in the checksum destination location of memory system 139e. Therefore, attempts to recover either of the foregoing data values stored in memory systems 139b and 139c may be enabled, provided that such attempts utilize the checksum stored in the checksum destination location. Note that, before enabling such attempts, the bit corresponding to the memory system 139a in the bit string 165f of checksum indicator 161e (i.e., in the bit string 165f that is correlated with the checksum destination location) should be deasserted to indicate that memory system 139a is not active.

In block 235, the checksum indicator 172 of mapper 146 is updated to indicate that the checksum of the foregoing data values in memory system 139b and 139c is stored in memory system 139e. In the present example, this is accomplished by asserting the bit corresponding with the memory system 139e in the bit string that is correlated with this same memory unit offset as the checksum destination location and by deasserting the remaining bits in the bit string. Block 235 ensures that any attempt to recover one of the foregoing data values stored in memory systems 139b and 139c utilizes the checksum stored in the checksum destination location instead of the checksum source location.

Also, in block 232, the recovery indicator 176 is updated to ensure that any data recovery attempt utilizing the checksum stored in the checksum destination location is enabled. In the preferred embodiment, this is accomplished by deasserting the bit corresponding with the checksum destination location. Therefore, if the mapper 146 receives an instruction to recover one of the data values stored in memory systems 139b or 139c at the locations correlated with the same memory unit as the checksum destination location, the mapper 146 first analyzes the checksum indicator 172 of mapper 146 to determine which memory system 139a–139e is storing the checksum of the data value to be recovered. Based on the checksum indicator 172, the mapper 146 should determine that memory system 139e is storing the checksum. As a result, the mapper 146 then analyzes the recovery indicator 176 to determine whether or not the data recovery can occur. Since the bit correlated with the checksum destination location is deasserted, the mapper 146 can proceed with recovering the data value.

In this regard, the mapper 146 transmits a command to memory system 139e instructing the memory controller 152e to recover the data value based on the checksum stored in the checksum destination location. The memory controller 152e analyzes the checksum indicator 161e of the memory system 139e and determines that memory systems 139*b* and 139*c* are the only other memory systems presently active. Therefore, to recover the data value stored in memory system 139*b*, the memory controller 152*e* exclusively ors the data value in the checksum destination location with the data value stored in memory system 139*c* at the location correlated with the same memory offset as the checksum destination location. The result of this exclusive or operation should be the recovered data value or, in other words, the data value that should be stored in memory system 139*b* at the location correlated with the same memory unit offset as the checksum destination location.

By implementing the foregoing techniques, checksums stored within memory systems 139*a*–139*e* can be dynamically moved to different memory locations without causing data errors. By enabling applications to continue executing on processors 142 during the checksum moves, the overall efficiency of the system 115 is increased. There is only a very short time period in which the data cannot be recovered if a memory controller fails during the move process.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A system for dynamically moving checksums, comprising:
   a first memory system having a first memory controller for storing data to and retrieving data from said first memory system, said first memory system having a first memory location correlated with a checksum indicator, said checksum indicator identifying another memory system that includes a checksum memory location, said checksum memory location storing a checksum associated with a data value stored in said first memory location;
   a second memory system having a second memory controller for storing and retrieving data to and from said second memory system; and
   a system manager configured to move said checksum from said checksum memory location to a destination memory location within said second memory system, said system manager further configured to update said checksum indicator to identify said second memory system instead of said other memory system, said system manager further configured to retrieve a data value from said checksum memory location and to update said checksum with said data value retrieved from said checksum memory location once said checksum has been moved to said destination memory location.

2. The system of claim 1, wherein said system manager is further configured to disable data recovery based on said checksum before moving said checksum from said checksum memory location to said destination memory location, and wherein said system manager is further configured to enable data recovery based on said checksum after updating said checksum with said data value retrieved from said checksum memory location.

3. The system of claim 1, wherein said checksum indicator comprises a string of bits, one of said bits corresponding to said second memory system.

4. The system of claim 1, wherein said first memory controller, before said checksum indicator is updated by said system manager, is configured to transmit, based on said checksum indicator, a request identifying said other memory system in response to a write request for writing a data value to said first memory location, and wherein said first memory controller, after said checksum indicator is updated by said system manager, is configured to transmit, based on said checksum indicator, a request identifying said second memory system in response to a write request for writing a data value to said first memory location.

5. A system for dynamically moving checksums, comprising:
   a plurality of memory systems, each of said memory systems having a memory unit and a memory controller for storing data to and retrieving data from said memory unit, each of said memory systems having a memory location correlated with a particular memory unit offset value and correlated with a respective one of a plurality of checksum indicators, each of said checksum indicators identifying a memory system that is storing a checksum at a checksum memory location correlated with said particular memory unit offset value; and
   a system manager configured to move a checksum from said checksum memory location to a destination memory location that is correlated with said particular memory unit offset value, said system manager further configured to update each of said checksum indicators to identify the memory system of said destination memory location, said system manager further configured to update said checksum stored in said destination memory location with a data value from said checksum memory location after updating each of said checksum indicators.

6. The system of claim 5, wherein said system manager is configured to disable data recovery based on said checksum before moving said checksum from said checksum memory location to said destination memory location, and wherein said system manager is configured to enable data recovery based on said checksum after updating each of said checksum indicators such that each of said checksum indicators identifies said memory system of said destination memory location.

7. The system of claim 5, wherein each of said checksum indicators includes a string of bits, each of said bits corresponding to a different memory system.

8. The system of claim 5, further comprising:
   a mapper configured to receive bus addresses and to translate said bus addresses into memory unit addresses identifying memory locations in said memory systems, said mapper including a checksum indicator that identifies which of said memory systems is presently storing a checksum at a memory location correlated with said particular memory unit offset value, said mapper configured to recover a data value based on said checksum indicator included in said mapper.

9. A method for dynamically moving checksums, comprising the steps of:
   providing a plurality of memory systems;
   storing a data value in a memory location of one of said memory systems;
   maintaining a checksum in another memory location of another of said memory systems;
   maintaining a checksum indicator that is correlated with said memory location of said one memory system and that identifies said other memory system;

analyzing said checksum indicator in response to said storing step;

updating said checksum in response to said storing step and based on said analyzing step;

storing said checksum to a destination memory location;

updating said checksum indicator such that said checksum indicator identifies a memory system of said destination memory location; and updating said checksum stored in said destination memory location with a data value from said other memory location of said other memory system.

10. The method of claim 9, further comprising the step of correlating each of said memory locations with the same memory unit offset value.

11. The method of claim 9, further comprising the steps of:

disabling data recovery based on said checksum prior to said storing said checksum step;

enabling data recovery based on said checksum; and ensuring that said enabling step occurs subsequent to said updating said checksum step.

12. A method for dynamically moving checksums, comprising the steps of:

providing a plurality of memory systems, each of said memory systems having a memory unit and a memory controller for storing data to and retrieving data from said memory unit;

correlating memory locations from said memory systems with the same memory unit offset value;

correlating checksum indicators with said memory locations that are correlated with said memory unit offset value, each of said checksum indicators identifying a particular one of said memory systems;

storing, in said particular one memory system, a checksum at a checksum memory location that is correlated with said memory unit offset value;

storing said checksum in another memory system at a destination memory location that is correlated with said memory unit offset value;

updating each of said checksum indicators such that each of said checksum indicators identifies said other memory system; and updating said checksum stored in said destination memory location with a data value from said checksum memory location.

13. The method of claim 12, further comprising the steps of:

disabling data recovery based on said checksum prior to said storing said checksum step;

enabling data recovery based on said checksum; and ensuring that said enabling step occurs subsequent to said updating said checksum step.

* * * * *